United States Patent
Cho et al.

(10) Patent No.: US 7,649,818 B2
(45) Date of Patent: Jan. 19, 2010

(54) OPTICAL RECORDING APPARATUS AND METHOD FOR SEARCHING FOR RECORDING POWER OF THE SAME

(75) Inventors: Kang Uk Cho, Seoul (KR); Yong Jin Ahn, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 522 days.

(21) Appl. No.: 11/449,803

(22) Filed: Jun. 9, 2006

(65) Prior Publication Data

US 2006/0280079 A1 Dec. 14, 2006

(30) Foreign Application Priority Data

Jun. 13, 2005 (KR) ...................... 10-2005-0050404

(51) Int. Cl.
*G11B 7/00* (2006.01)
(52) U.S. Cl. .................................. 369/47.53; 369/53.18
(58) Field of Classification Search ........................ None
See application file for complete search history.

(56) References Cited

U.S. PATENT DOCUMENTS

| | | | | |
|---|---|---|---|---|
| 4,858,220 A | * | 8/1989 | Funada | 369/116 |
| 5,140,580 A | * | 8/1992 | Ohara et al. | 369/53.18 |
| 5,513,167 A | * | 4/1996 | Udagawa et al. | 369/59.12 |
| 6,275,462 B1 | * | 8/2001 | Masaki et al. | 369/116 |
| 7,193,943 B2 | * | 3/2007 | Suzuki | 369/47.53 |
| 2003/0072233 A1 | | 4/2003 | Naoi et al. | |
| 2003/0156514 A1 | * | 8/2003 | Suzuki | 369/47.53 |
| 2004/0136303 A1 | | 7/2004 | Watanabe et al. | |
| 2005/0237885 A1 | * | 10/2005 | Ma et al. | 369/47.53 |
| 2006/0098542 A1 | * | 5/2006 | Kuwayama | 369/47.5 |
| 2007/0019529 A1 | * | 1/2007 | Ho | 369/116 |
| 2008/0037392 A1 | * | 2/2008 | Uchino et al. | 369/47.5 |

FOREIGN PATENT DOCUMENTS

| | | |
|---|---|---|
| JP | 2001-344793 | 12/2001 |
| JP | 2003-196834 | 7/2003 |
| KR | 2004-57894 | 7/2004 |

OTHER PUBLICATIONS

Van Der Kali, WO 2004/064059 A1, published Jul. 29, 2004, World Intellectual Property Organization.*

* cited by examiner

*Primary Examiner*—Peter Vincent Agustin
(74) *Attorney, Agent, or Firm*—Stein McEwen, LLP

(57) ABSTRACT

An optical recording apparatus uses a method of searching for a recording power, where the method includes: searching for a first optimum recording power; recording data on an optical disc at the first optimum recording power; determining whether recording environments are changed when a user desires to re-record the data after recording the data in the optical recording apparatus; re-searching for the optimum recording power when the recording environments are changed, and determining the researched optimum recording power to be a second optimum recording power; and recording the data at the second optimum recording power.

5 Claims, 2 Drawing Sheets

OPTICAL RECORDING APPARATUS AND METHOD FOR SEARCHING FOR RECORDING POWER OF THE SAME

CROSS-REFERENCE TO RELATED APPLICATION

This application claims the benefit of Korean Application No. 2005-50404, filed Jun. 13, 2005 in the Korean Intellectual Property Office, the disclosure of which is incorporated herein by reference.

BACKGROUND OF THE INVENTION

1. Field of the Invention

Aspects of the present invention relate to an optical recording apparatus and a method of searching for a recording power of the optical recording apparatus, and, more particularly, to an optical recording apparatus capable of recording data at an optimum recording power irrespective of a variation in recording environments (e.g., a variation in temperature of a pickup unit), and a method of establishing a recording power of the same.

2. Description of the Related Art

Generally, optical recording apparatuses have been widely used to record data on varieties of optical discs (e.g., a CD, a DVD, and a BD), and have been designed to perform Optimum Power Control (OPC) processes that are capable of establishing an optimum recording power before the recording of data on the optical discs.

A particular OPC process has been disclosed in the disclosures of Korean Patent Laid-Open Publication No. 2004-57894 and U.S. Patent Publication No. 2004-136303, which are incorporated herein by reference. According to the OPC processes, if an optical disc is seated in the optical recording apparatus, a laser diode sequentially changes a laser power simultaneously while recording test data in a Power Calibration Area (PCA), and estimates the quality of a reproduction signal acquired when the test data is reproduced. Thereafter, the laser diode sets a laser power to an optimum recording power, at which recorded test data is capable of acquiring the best reproduction signal.

Where the above-mentioned conventional optical recording apparatus records data at the optimum recording power acquired by the above-mentioned OPC process, enters a standby mode for a predetermined period of time, and, then, re-records data on the optical disc, the temperature of the pickup unit including the laser diode may be unexpectedly increased, or the recording environment may be otherwise changed, resulting in a variation in wavelength of a laser beam from the laser diode. As a result, although the optical power of the laser beam applied to the optical disc is changed, the laser diode transmits the same drive voltage as that of the laser diode, and at the same time records data in the optical disc.

In conclusion, the laser beam having an optical power value different from the optimum recording power is applied to the optical disc, such that the recording quality may be greatly deteriorated when data is recorded using the laser beam.

SUMMARY OF THE INVENTION

Therefore, it is an aspect of the invention to provide an optical recording apparatus and a method for establishing a recording power of the same, which re-establish an optimum recording power irrespective of a variation in recording environments when a data recording process is re-executed after the preceding data recording process and the standby mode have been executed, such that high-quality data can be recorded in an optical disc.

In accordance with an aspect of the invention, the above and/or other aspects may be achieved by the provision of a method of searching for a recording power of an optical recording apparatus comprising: searching for a first optimum recording power; recording data in an optical disc at the first optimum recording power; determining whether recording environments are changed when a user desires to re-record the data after recording the data in the optical recording apparatus; re-searching for the optimum recording power when the recording environments are changed, and determining the researched optimum recording power to be a second optimum recording power; and recording the data at the second optimum recording power.

According to an aspect of the invention, the method further comprises: if a difference between a temperature of a pickup unit capable of recording data in the optical disc and a temperature acquired when the first optimum recording power is found is equal to or higher than a first reference value when the user desires to re-record the data, determining that the recording environments are changed.

According to an aspect of the invention, the method further comprises: if a difference between a temperature of a pickup unit capable of recording data in the optical disc and a temperature acquired at a previous data record termination time is equal to or higher than a second reference value when the user desires to re-record the data, determining that the recording environments are changed.

According to an aspect of the invention, the method further comprises: if a specific time at which the user desires to re-record the data is longer than a time at which the first optimum recording power has been found by a reference time or over, determining that the recording environments are changed.

According to an aspect of the invention, the method further comprises: if a recording item acquired when the user desires to re-record the data is equal to a specific recording item, determining that the recording environments are changed.

According to an aspect of the invention, the specific recording item includes a finalizing record item, a record management data (RMD) record item, a file system record item, and a format item.

According to an aspect of the invention, the method further comprises: if the optical recording apparatus enters a power-saving mode when the user desires to re-record the data, determining that the recording environments are changed.

According to an aspect of the invention, the method further comprises: referring to the first optimum recording power and a laser diode drive voltage when re-searching for the optimum recording power.

In accordance with another aspect of the present invention, there is provided an optical recording apparatus comprising: a laser diode to emit a laser beam; a laser diode drive to operate the laser diode; a photo-detector to receive the laser beam reflected from an optical disc; and a microprocessor to search for an optimum recording power by controlling the laser diode drive and a photo-diode. The microprocessor searches for the optimum recording power, records data at the optimum recording power, enters a standby mode, determines whether recording environments are changed when a user desires to re-record data, re-searches for the optimum recording power when the recording environments are changed, determines the researched optimum recording power to be a second optimum recording power, and records data at the second optimum recording power.

According to an aspect of the invention, the apparatus further comprises: a pickup-unit temperature sensor contained in a pickup unit including the laser diode, the laser diode drive, and the photo-detector, wherein the microprocessor, if a difference between a temperature of a pickup unit and a temperature acquired when the first optimum recording power is found is equal to or higher than a first reference value when the user desires to re-record the data, or if a difference between the temperature of the pickup unit and a temperature acquired at a previous data record termination time is equal to or higher than a second reference value when the user desires to re-record the data, determines that the recording environments are changed.

According to an aspect of the invention, the apparatus further comprises: if a specific time at which the user desires to re-record the data is longer than a time at which the first optimum recording power has been found by a reference time or over, the microprocessor determines that the recording environments are changed.

According to an aspect of the invention, a recording item acquired when the user desires to re-record the data is equal to a specific recording item, the microprocessor determines that the recording environments are changed.

According to an aspect of the invention, the specific recording item includes a finalizing record item, a record management data (RMD) record item, a file system record item, and a format item.

According to an aspect of the invention, the optical recording apparatus enters a power-saving mode when the user desires to re-record the data, the microprocessor determines that the recording environments are changed.

Additional and/or other aspects and advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
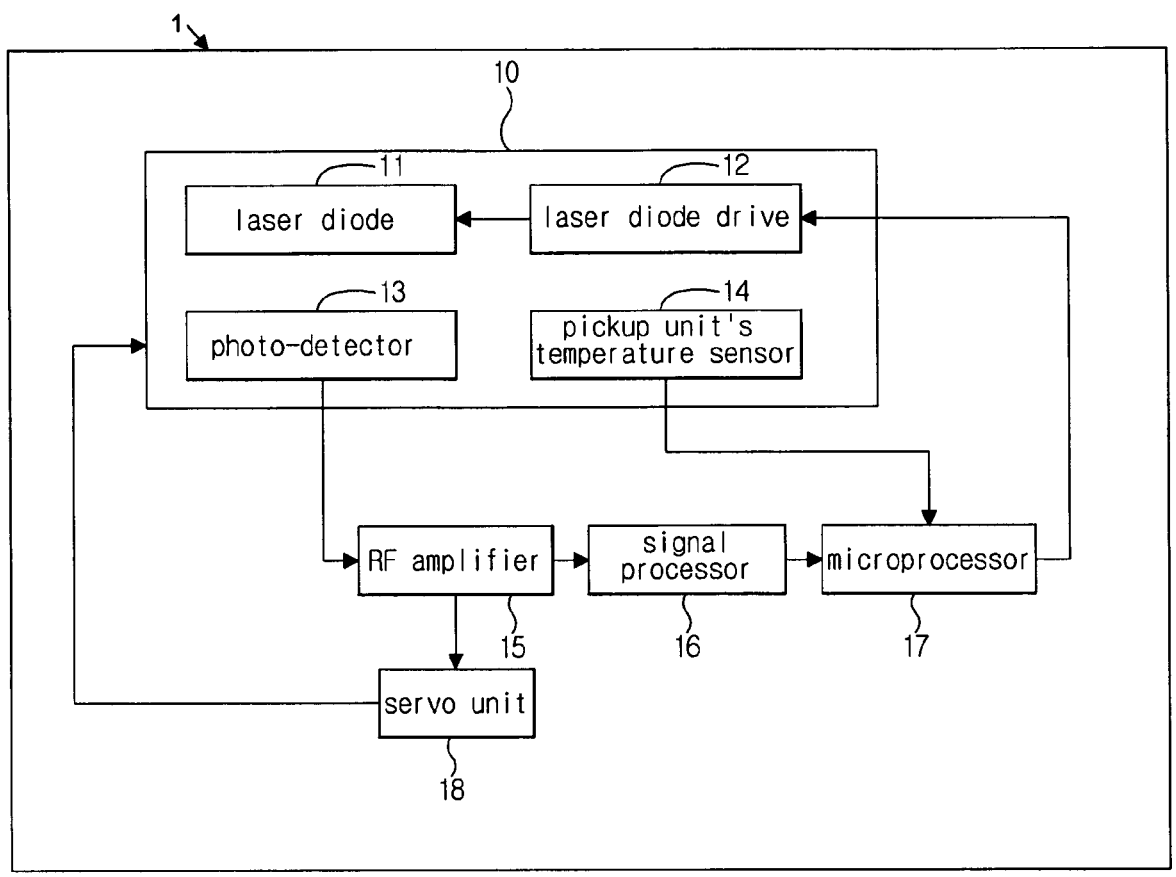
FIG. 1 is a block diagram illustrating an optical recording apparatus according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a block diagram illustrating an optical recording apparatus 1 according to an embodiment of the present invention. As shown in FIG. 1, the optical recording apparatus 1 according to the present invention includes a pickup unit 10, a Radio Frequency (RF) amplifier 15, a servo unit 18, a signal processor 16, and a microprocessor 17. While described as a recording apparatus, it is understood that the apparatus can further reproduce data in other aspects of the invention.

The pickup unit 10 includes: a laser diode 11 to emit a laser beam; a laser diode drive 12 to operate the laser diode 11; a photo-detector 13 to receive an optical signal reflected from an optical disc (not shown), and to convert the received optical signal into a current signal; and a temperature sensor of the pickup unit 14 to detect a temperature of the pickup unit 10. The pickup unit 10 further includes: a collimator lens (not shown) to convert a radiated optical signal into a parallel optical signal; an objective lens (not shown) operated by a focus-actuator (not shown) and a tracking actuator (not shown); and a beam splitter (not shown) to split an incident optical signal into several optical signals. Therefore, the pickup unit 10 shoots the laser beam at the optical disc (not shown) using the above-mentioned components, such that the pickup unit 10 records data on the optical disc or receives an optical signal reflected from the optical disc.

The RF amplifier 15 generates an RF signal to act as reproduction data upon receiving an electrical signal from the pickup unit 10, and generates a focus error (FE) signal that is capable of detecting a focus separation and a tracking error (TE) signal that is capable of detecting a track separation. The servo unit 18 receives the focus error (FE) signal and the tracking error (TE) signal from the RF amplifier 15, receives a spindle error signal from the microprocessor 17, and generates individual drive signals for the focusing-, tracking-, and spindle-operations.

The signal processor 16 performs a data processing operation on the RF signal. The microprocessor 17 controls the pickup unit 10, the RF amplifier 15, the signal processor 16, and the servo unit 18. The microprocessor 17 performs the OPC process to search for an optimum recording power before recording data using the above-mentioned components 10, 15,16, and 18.

Figure 2:
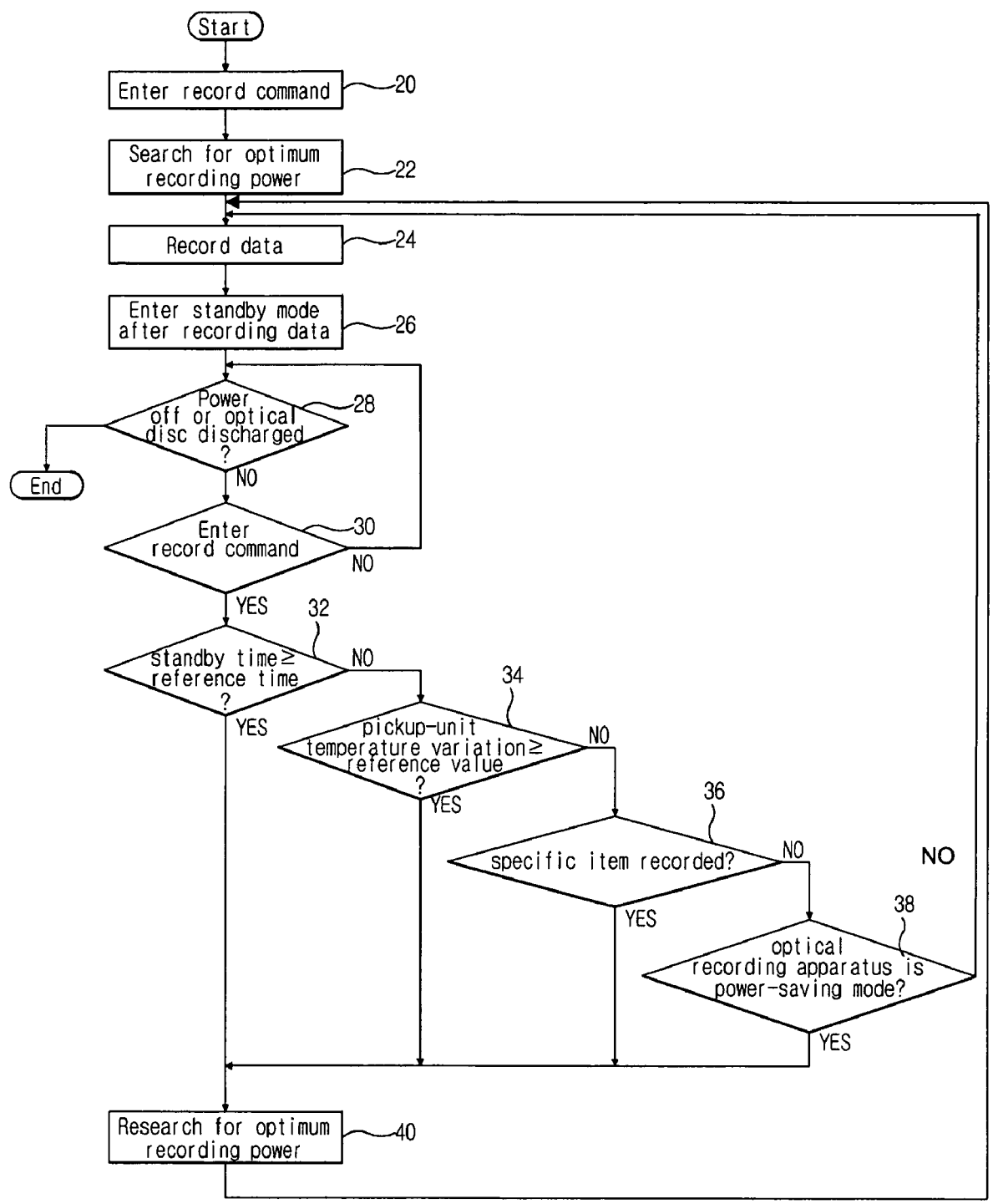
FIG. 2 is a flow chart illustrating a method for searching for a recording power of the optical recording apparatus of FIG. 1 according to an embodiment of the present invention.

FIG. 2 is a flowchart illustrating a method of searching for a recording power of the optical recording apparatus 1 of FIG. 1. As shown in FIG. 2, if a user or a device controlled recording enters a data record command at operation 20, the optical recording apparatus 1 performs the OPC process to search for an optimum recording power at operation 22. During the OPC process, the optical recording apparatus 1 changes a drive voltage of the laser diode 11 to sequentially change an optical power of the laser beam, records test data in a power Calibration Area (PCA) of an information area of the optical disc, reproduces the recorded test data, and determines a specific optical power to be an optimum recording power, at which data of the best reproduction signal quality is recorded.

If the optimum recording power is selected, the laser diode 11 receives a laser diode drive voltage at which a corresponding optimum recording power may be generated, such that data is recorded on the optical disc at the optimum recording power at operation 24. If the data is completely recorded on the optical disc, the optical recording apparatus 1 enters a standby mode for the next data recording at operation 26.

The standby mode may be cancelled if the optical recording apparatus 1 is powered off or if the optical disc seated in an optical disc drive (not shown) is separated from the optical disc drive at operation 28. If the optical recording apparatus 1 is powered off or the optical disc is separated and discharged from the optical disc drive at operation 28, the standby mode is terminated. Otherwise, if the optical recording apparatus 1 remains powered on or the optical disc is not discharged from the optical disc drive at operation 28, the optical recording apparatus 1 determines whether the user enters a data record command at operation 30.

If the user enters no data record command at operation 30, the optical recording apparatus 1 returns to operation 28. Otherwise, if the user enters the data record command at operation 30, the optical recording apparatus 1 determines whether a standby time is equal to or longer than a reference time at operation 32. Here the standby time is equal to a predetermined time from a first time at which a previous optimum recording power has been detected to a second time at which the user desires to re-record data or is equal to a length of time from when the optical recording apparatus 1 enters the standby mode to when the data record command is received. In more detail, if the user enters the data record command at a specific time during the standby mode, the specific time is considered to be the second time.

According to the aforementioned embodiment of the present invention, although the predetermined time from the first time to the second time has been determined to be the standby time, the standby time may also be changed to be another time from a specific time similar to the aforementioned time to a termination time, if required. For example, a time from a start time of a previous data recording operation to an end time at which the user desires to re-record data may be set to the standby time if required.

In addition, the reference time may be set to be an average time during which a wavelength of the laser beam is changed by an increased temperature caused by the driving of the pickup unit and then an optical power of the laser beam applied to the optical disc is higher than a recording margin. In more detail, if the standby time is longer than the reference time, the wavelength of the laser beam is changed by the increased temperature of the pickup unit, and the recording quality may be greatly deteriorated, such that the optical recording apparatus 1 re-searches for the optimum recording power at operation 40.

When the optical recording apparatus 1 re-searches for the optimum recording power, the optimum recording power may be set to the same value as a previously-selected value or a value similar to the previously-selected value. However, only the laser diode drive voltage capable of acquiring the optimum recording power may be changed if required. Therefore, when the optical recording apparatus 1 re-searches for the optimum recording power at operation 40, the laser diode drive voltage may be changed in the range similar to that of the previous OPC process in such a way that the OPC process must be performed.

In the meantime, if the standby time is less than the reference time at operation 32, the optical recording apparatus 1 determines whether a temperature variation of the pickup unit 10 is equal to or higher than the reference value at operation 34. In this case, the temperature variation of the pickup unit 10 is indicative of a difference between a first pickup-unit temperature detected at a previous optimum recording power search time and a second pickup-unit temperature detected at which the user desires to re-record data. Similar to the above-mentioned standby time, in association with the temperature variation of the pickup unit 10, a time at which the temperature sensor 14 detects the temperature of the pickup unit 10 may be different from the above-mentioned time. For example, the temperature variation of the pickup unit 10 may be set to a difference of values between the temperature of the pickup unit that is acquired when the previous data recording is completed and the other temperature of the pickup unit that is acquired when the user desires to re-record data.

Further, the reference value may be established in yet a different way. If a reference value for the former case (wherein the temperature variation is equal to a difference value between the temperature of the pickup unit 10 that is acquired when the optimum recording power has been previously found and the other temperature of the pickup unit 10 that is acquired when the user desires to re-record data) is a first reference value, a reference value for the latter case (wherein the temperature variation is equal to a difference value between the temperature of the pickup unit 10 that is acquired when the previous data recording is completed and the other temperature of the pickup unit 10 that is acquired when the user desires to re-record data) is set to a second reference value.

If the temperature variation of the pickup unit 10 is equal to or higher than the reference value at operation 34, the temperature of the pickup unit 10 greatly changes the wavelength of the laser beam, and the optical power of the laser beam applied to the optical disc is higher than a recording margin, such that the optical recording apparatus 1 re-searches for the optimum recording power at operation 40. In more detail, the temperature of the pickup unit 10 is excessively changed although the standby time is not longer than the reference time, such that the previously-established optimum recording power may be improper. Due to the aforementioned problems, the optical recording apparatus 1 determines whether to re-search for the optimum recording power by referring to the temperature variation of the pickup unit 10.

In the meantime, if the temperature variation of the pickup unit 10 is less than the reference value at operation 34, the optical recording apparatus 1 determines whether a recording item is indicative of a specific recording item at operation 36. In this case, the specific recording item includes a finalizing operation, record management data, a file system record, and a format, etc. Here, the finalizing operation is indicative of a task of allowing data of the optical disc to be reproduced by other playback devices, and the record management data is indicative of content associated with the recording condition (e.g., an optical power in a data recording operation). The file system record is indicative of an operation during which start- and end- addresses of the data record area are recorded. The format is indicative of an operation of deleting a variety of data recorded in the information area. The optimum recording power acquired when the specific recording items are recorded is different from an optimum recording power acquired when the content is recorded, such that the optical recording apparatus 1 establishes a new optimum recording power at operation 40.

In the meantime, if the recording item is not equal to the specific recording item at operation 36, the optical recording apparatus 1 determines whether a current mode is a power-saving mode or a sleep mode in operation 38. If the optical recording apparatus 1 determines that the current mode is the power-saving mode or the sleep mode, the optical recording apparatus 1 re-searches for the optimum recording power at operation 38. In more detail, the optical recording apparatus 1 performs the above operation 38 to cross-check if the optimum recording power is re-searched for. Although the condition for re-searching for the optimum recording power may not be satisfied at operations 32 and 34 due to an erroneous counting function of the microprocessor 17 or erroneous operations of the temperature sensor 14 of the pickup unit 10, the optical recording apparatus 1 enters the standby mode for a long period of time if a current mode is the power-saving mode or the sleep mode, such that the optical recording apparatus 1 re-searches for the optimum recording power at operation 40. If the current mode is not the power saving mode, the method ends.

If the above-mentioned conditions are satisfied and the optimum recording power is re-searched for, the optical recording apparatus 1 returns to operation 24, sets an optical power of the laser beam to the optimum recording power, and records data in an optical disc at operation 40. While sets of specific conditions are set forth in FIG. 2, it is understood that other conditions can be used instead of or in addition to operations 32, 34, 36, and 38, and that not all of the operations 32, 34, 36, and 38 need to be used in all aspects of the invention.

While not required, it is understood that aspects of the invention can be implemented as software and/or firmware.

As is apparent from the above description, an optical recording apparatus 1 and a method of establishing a recording power of the same, according to aspects of the present invention, re-search for an optimum recording power if there is a variation in recording environments (e.g., a temperature variation of the pickup unit) when a data recording process is re-executed after the preceding data recording process and the standby mode have been executed, such that data may be optimally recorded in an optical disc.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An optical recording apparatus comprising:
a laser diode to emit a laser beam;
a laser diode driver to operate the laser diode;
a photo-detector to receive the laser beam, the laser beam having been reflected from an optical disc; and
a microprocessor to search for an optimum recording power by controlling the laser diode driver and the photo-detector, wherein the microprocessor searches for a first optimum recording power, records data at the first optimum recording power, enters a standby mode, determines whether recording environments have changed when a user desires to further record data, re-searches for a second optimum recording power when the recording environments have changed,
wherein, if a specific time at which the user desires to re-record the data is longer than a time at which the first optimum recording power has been found by a reference time or over, the microprocessor determines that the recording environments are changed.

2. The apparatus according to claim 1, further comprising a pickup-unit temperature sensor contained in a pickup unit including the laser diode, the laser diode driver, and the photo-detector, wherein, if a difference between a temperature of a pickup unit and a temperature acquired when the first optimum recording power is found is equal to or higher than a first reference value when the user desires to re-record the data, or if a difference between the temperature of the pickup unit and a temperature acquired at a previous data record termination time is equal to or higher than a second reference value when the user desires to re-record the data, the microprocessor determines that the recording environments are changed.

3. The apparatus according to claim 1, wherein, if a recording item acquired when the user desires to re-record the data is equal to a specific recording item, the microprocessor determines that the recording environments are changed.

4. The apparatus according to claim 3, wherein the specific recording item includes a finalizing record item, a record management data (RMD) record item, a file system record item, a format item, or combinations thereof.

5. An optical recording apparatus comprising:
a laser diode to emit a laser beam;
a laser diode driver to operate the laser diode;
a photo-detector to receive the laser beam, the laser beam having been reflected from an optical disc; and
a microprocessor to search for an optimum recording power by controlling the laser diode driver and the photo-detector, wherein the microprocessor searches for a first optimum recording power, records data at the first optimum recording power, enters a standby mode, determines whether recording environments have changed when a user desires to further record data, re-searches for a second optimum recording power when the recording environments have changed,
wherein, if the optical recording apparatus enters a power-saving mode when the user desires to re-record the data, the microprocessor determines that the recording environments are changed.

* * * * *

UNITED STATES PATENT AND TRADEMARK OFFICE
CERTIFICATE OF CORRECTION

PATENT NO. : 7,649,818 B2  Page 1 of 1
APPLICATION NO. : 11/449803
DATED : January 19, 2010
INVENTOR(S) : Cho et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 746 days.

Signed and Sealed this

Twenty-third Day of November, 2010

David J. Kappos
*Director of the United States Patent and Trademark Office*